United States Patent
Wicaksana et al.

(10) Patent No.: US 10,187,100 B2
(45) Date of Patent: Jan. 22, 2019

(54) APPARATUS AND METHOD FOR DIRECT RADIO FREQUENCY (RF) SAMPLING IN NEAR FIELD COMMUNICATION (NFC) DEVICES

(71) Applicant: HUAWEI INTERNATIONAL PTE. LTD., Singapore (SG)

(72) Inventors: Harya Wicaksana, Singapore (SG); Zhan Yu, Singapore (SG); Rui Yu, Singapore (SG); Theng Tee Yeo, Singapore (SG); Changqing Xu, Singapore (SG); Xuesong Chen, Singapore (SG)

(73) Assignee: Huawei International PTE. Ltd., Singapore (SG)

( * ) Notice: Subject to any disclaimer, the term of this patent is extended or adjusted under 35 U.S.C. 154(b) by 0 days.

(21) Appl. No.: 15/926,696

(22) Filed: Mar. 20, 2018

(65) Prior Publication Data
US 2018/0212635 A1   Jul. 26, 2018

Related U.S. Application Data

(63) Continuation of application No. PCT/SG2016/050435, filed on Sep. 6, 2016.

(30) Foreign Application Priority Data

Nov. 9, 2015 (SG) .................. 10201509261 U

(51) Int. Cl.
*H04B 5/00* (2006.01)
*H04B 1/16* (2006.01)
*H04W 4/80* (2018.01)
*H04L 25/06* (2006.01)
*H04L 27/00* (2006.01)
*G06K 7/10* (2006.01)

(52) U.S. Cl.
CPC ............ *H04B 1/16* (2013.01); *H04B 5/0056* (2013.01); *H04L 25/061* (2013.01); *H04L 27/0014* (2013.01); *H04W 4/80* (2018.02); *G06K 7/10237* (2013.01); *H04L 2027/0026* (2013.01)

(58) Field of Classification Search
CPC ......... H04B 5/00–5/06; G06K 7/10237; H04L 2027/0026; H04L 2027/003–2027/0038
See application file for complete search history.

(56) References Cited

U.S. PATENT DOCUMENTS

| | | | |
|---|---|---|---|
| 7,991,434 B2* | 8/2011 | Yen ........................ | G06K 19/07 455/41.1 |
| 8,260,199 B2* | 9/2012 | Kowalski ........... | G06K 7/10178 235/462.25 |
| 9,712,317 B2* | 7/2017 | Frantzeskakis ...... | H04B 5/0031 |
| 9,787,508 B2* | 10/2017 | Ratnakar ............... | H04L 7/0008 |
| 2007/0237274 A1 | 10/2007 | Nakache et al. | |

(Continued)

FOREIGN PATENT DOCUMENTS

WO    2010109978 A1    9/2010

*Primary Examiner* — Duc M Nguyen
(74) *Attorney, Agent, or Firm* — Leydig, Voit & Mayer, Ltd.

(57) ABSTRACT

Embodiments of the invention provide a system and method for direct RF sampling a Near Field Communication (NFC) receiver at a rate higher than the carrier frequency by reducing and shifting requirements at a front end analog module to a digital module.

16 Claims, 8 Drawing Sheets

(56) References Cited

U.S. PATENT DOCUMENTS

| | | | |
|---|---|---|---|
| 2008/0079549 A1* | 4/2008 | Yamada | G06K 7/10237 340/10.5 |
| 2011/0261909 A1 | 10/2011 | Andgart et al. | |
| 2012/0322399 A1 | 12/2012 | Sheikholeslami | |
| 2013/0112747 A1* | 5/2013 | McFarthing | H01Q 1/2225 235/439 |
| 2013/0314215 A1* | 11/2013 | Kitayoshi | G06K 19/07749 340/10.1 |
| 2014/0016719 A1* | 1/2014 | Manku | G06K 19/0723 375/295 |
| 2014/0266611 A1* | 9/2014 | Breitfuss | G06K 7/10386 340/10.1 |
| 2017/0288741 A1* | 10/2017 | Zhu | H04B 5/02 |

\* cited by examiner

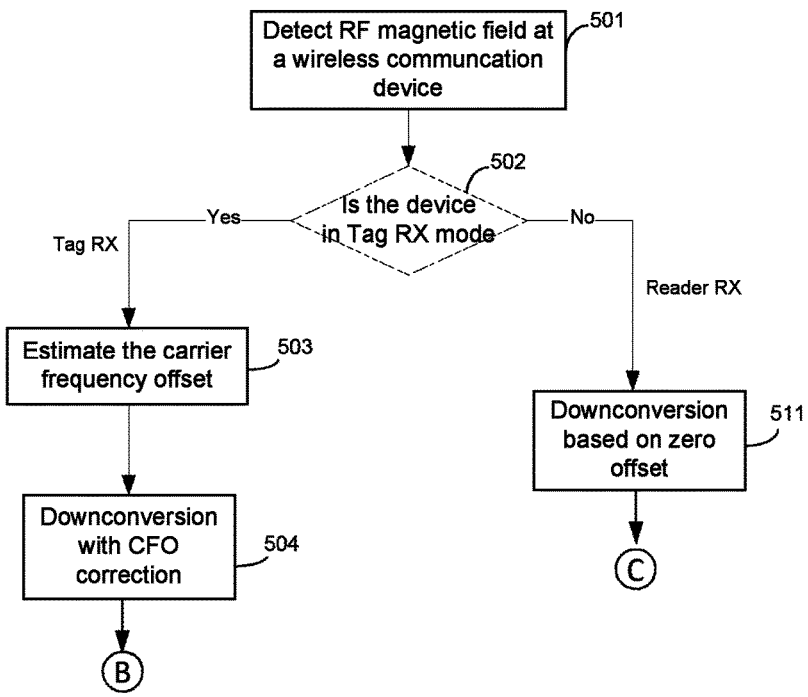
Figure 5A
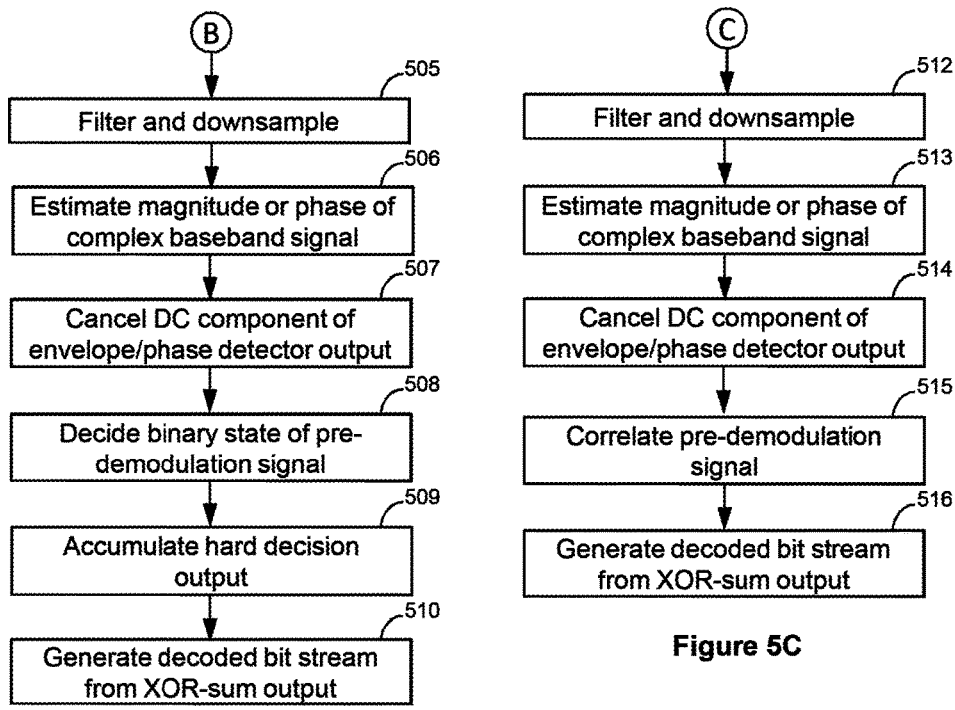
Figure 5B
Figure 5C

APPARATUS AND METHOD FOR DIRECT RADIO FREQUENCY (RF) SAMPLING IN NEAR FIELD COMMUNICATION (NFC) DEVICES

CROSS-REFERENCE TO RELATED APPLICATIONS

This application is a continuation of International Application No. PCT/SG2016/050435, filed on Sep. 6, 2016, which claims priority to Singaporean Patent Application No. 10201509261U, filed on Nov. 9, 2015. The disclosures of the aforementioned applications are hereby incorporated by reference in their entireties.

FIELD OF INVENTION

Embodiments of the invention relate Near Field Communication (NFC) receiver architecture which is capable of direct radio frequency (RF) sampling.

BACKGROUND

Near Field Communication (NFC) enables contactless short range communication between two devices, typically requiring a short-range distance of 4 cm or less to initiate a connection. NFC connection is much faster than other communication technologies such as Bluetooth or Wi-Fi. A user is only required to bring two NFC-supported devices within reading range to transfer data therebetween automatically. NFC applications include, but are not limited to, credit card payment, ticketing, content sharing, quick pairing.

NFC-supported devices may operate either as a NFC reader or a NFC card or tag which modulates information bits with a carrier frequency of 13.56 MHz. In a typical NFC receiver, a received NFC modulated signal is sampled either after downconversion or after envelope detection. This is because older CMOS technology, such as 0.35 u or 0.18 um, only affords low resolution and low sampling frequency of analog to digital conversion.

FIG. 1A shows an existing NFC receiver architecture with zero intermediate frequency. The analog front end consists of a direct in-phase and quadrature-phase analog mixer to downconvert a received signal to baseband signal, an analog filter to filter out higher frequency components of the mixer output, a VGA to amplify the filter output, and an analogue digital convertor (ADC) to convert the VGA output into a digital signal. A low resolution ADC is normally adopted for NFC amplitude shift keying (ASK) or binary phase-shift keying (BPSK) demodulation.

However, the architecture of FIG. 1A is expected to have the following drawbacks: high complexity at analog front end before sampling the RF signal; requires in-phase and quadrature-phase clock generation; overall area of analog and digital silicon area is large; does not utilize strong baseband processing in current mobile devices or Tablet PCs.

FIG. 1B shows an existing envelope detector based NFC receiver architecture. The analog front end consists of a diode based envelope detector, a high pass filter to remove direct current (DC) offset, a gain amplifier to amplify the signal, a low pass filter to filter RF carrier and its harmonics, and a comparator to digitize data for further processing. Compared to the architecture of FIG. 1A, the architecture of FIG. 1B does not require local oscillator mixing or high resolution ADC in the receiver chain.

However, the architecture of FIG. 1B is expected to have the following drawbacks: receiver sensitivity is limited, signal with low modulation index may pose problems; higher noise compared to other architecture; only amplitude demodulation is possible and may have NFC communication hole issue.

In view of the above and other issues, higher resolution and higher sampling frequency are desirable.

SUMMARY

According to one embodiment of the invention, a Near Field Communication (NFC) receiver is provided. The NFC receiver comprises:

an analog-to-digital converter (ADC) for digitising a received NFC signal at a sampling rate higher than a carrier frequency of the received NFC signal;

a carrier frequency offset (CFO) module which is configured to estimate a CFO between the NFC receiver and a NFC transmitter propagating the received NFC signal if the NFC receiver is operative as tag reader;

a digital downconverter which is configured to downconvert, with CFO correction based on the estimated CFO, the digitised signal to a baseband complex signal centered at zero frequency, if the NFC receiver is operative as NFC tag;

one of an envelope detector and a phase detector for respectively ascertaining one of an amplitude and a phase of the downconverted signal and generating a pre-demodulation signal;

and a demodulator for generating a decoded bit stream from the pre-demodulation signal.

In certain embodiments of the NFC receiver, the demodulator includes a first module which is operative if the NFC receiver is operative as NFC tag, wherein the first module includes:

a hard decision module configured to convert the pre-demodulation signal into binary bit stream based on a predetermined threshold;

an XOR sum module configured to perform an XOR operation on each locally-stored sample of the binary bit stream with a locally-stored reference followed by a summation operation on a plurality of results generated from the XOR operation; and a synchronisation and bit decision module configured to perform frame synchronization and bit decision based the XOR sum module output.

In certain embodiments of the NFC receiver, the digital downconverter is further configured to downconvert, with zero frequency offset, the digitised signal to a baseband complex signal centered at zero frequency, if the NFC receiver is operative as NFC reader.

In certain embodiments of the NFC receiver, the demodulator includes a second module which is operative if the NFC receiver is operative as NFC receiver, a correlator configured to perform multiplication operation on the pre-demodulation signal with a plurality of correlator coefficients; and a synchronisation and bit decision module configured to perform frame synchronization and bit decision based the correlator output.

In certain embodiments of the NFC receiver, the plurality of correlator coefficients are predetermined based on data rate and the sampling rate.

In certain embodiments of the NFC receiver, the digital downconverter is further configured to ascertain whether the NFC receiver is operative as NFC tag or NFC reader.

In certain embodiments of the NFC receiver, the sampling rate is four times the carrier frequency of the received NFC signal.

In certain embodiments of the NFC receiver, the NFC receiver further comprises a DC cancellation module for removing DC offset component from the pre-demodulation signal prior to use in the demodulator.

According to one embodiment of the invention, a method of sampling at a Near Field Communication (NFC) receiver is provided. The method comprises:

detecting a radio frequency (RF) field at a NFC-supported device, including receiving a NFC signal;

digitising the received NFC signal;

if the NFC receiver is operating as NFC tag, estimating a carrier frequency offset (CFO) between the digitised signal and a clock frequency of the NFC-supported device, and performing downconversion of the digitised signal with CFO correction based on the estimated CFO; and if the NFC receiver is operative as NFC reader, performing downconversion based on zero frequency offset.

If the NFC receiver is ascertained operating as NFC tag, the above method further comprises:

low-pass filtering the downconverted signal;

downsampling the low-pass filtered signal;

estimating one of magnitude and phase of the downsampled signal to generate a pre-demodulation signal; and demodulating the pre-demodulation signal, including converting the pre-demodulation signal to a binary data stream, performing XOR-summation operation on the binary data stream to generate an XOR-sum output, and generating a decoded bit stream from the XOR-sum output.

If the NFC receiver is ascertained operating as NFC reader, the above method further comprises:

low-pass filtering the downconverted signal;

downsampling the low-pass filtered signal;

estimating one of magnitude and phase of the downsampled signal to generate a pre-demodulation signal; and demodulating the pre-demodulation signal, including correlating the pre-demodulation signal, and generating a decoded bit stream from the correlated output.

In certain embodiments of the invention, the step of estimating one of magnitude and phase of the downsampled signal to generate a pre-demodulation signal further includes cancelling DC offset component to generate the pre-demodulation signal.

According to one embodiment of the invention, a non-transitory computer readable medium is provided which comprises computer program code for direct radio frequency (RF) sampling at a Near Field Communication (NFC) receiver, wherein the computer program code, when executed, is configured to cause a processor in a Near Field Communication (NFC)-supported device perform any of the above-described methods.

BRIEF DESCRIPTION OF DRAWINGS

The invention will be described in detail with reference to the accompanying drawings, in which:

FIGS. 5A to 5C illustrate method(s) for direct RF sampling in a NFC receiver, including direct RF sampling when the NFC receiver is operating as NFC tag and direct RF sampling when the NFC receiver is operating as NFC reader;

DETAILED DESCRIPTION

Figure 1A:
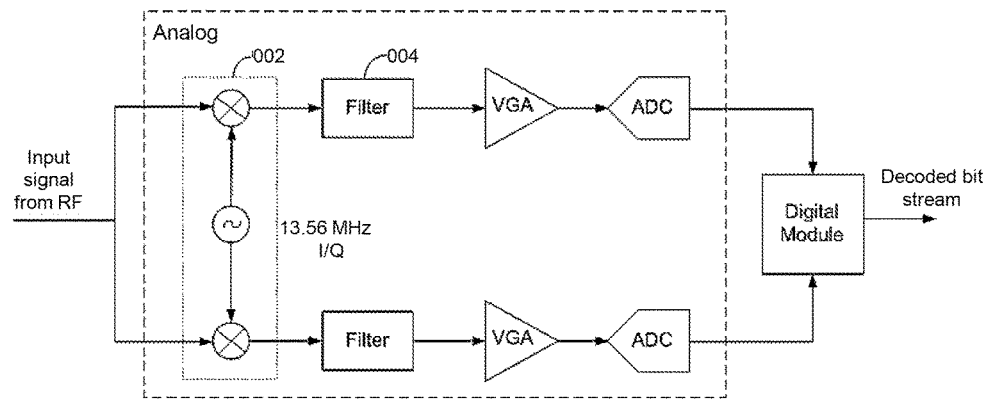
FIG. 1A shows an existing NFC receiver architecture with zero intermediate frequency.

In the following description, numerous specific details are set forth in order to provide a thorough understanding of various illustrative embodiments of the invention. It will be understood, however, to one skilled in the art, that embodiments of the invention may be practiced without some or all of these specific details. It is understood that the terminology used herein is for the purpose of describing particular embodiments only, and is not intended to limit the scope of the invention.

In the drawings, like reference numerals refer to same or similar functionalities or features throughout the several views. It is to be appreciated that the functional blocks illustrated in various Figures do not necessarily represent components of a physical implementation of a NFC receiver architecture, but instead represent functions that are performed by the NFC receiver architecture. In practice, each functional block may be implemented by one or more discrete components or elements, or combinations thereof.

Embodiments of the invention provide RF sampling techniques with higher resolution and higher sampling frequency of ADC. With the use of advanced CMOS technology, higher resolution ADC with lower power and size can be achieved. Analog front end requirement is reduced by utilising more complex digital processing. This is especially useful for combo chipset development where the analog front end resources could be limited while strong baseband processing is readily provided by mobile devices or tablet PCs.

Figure 2A:
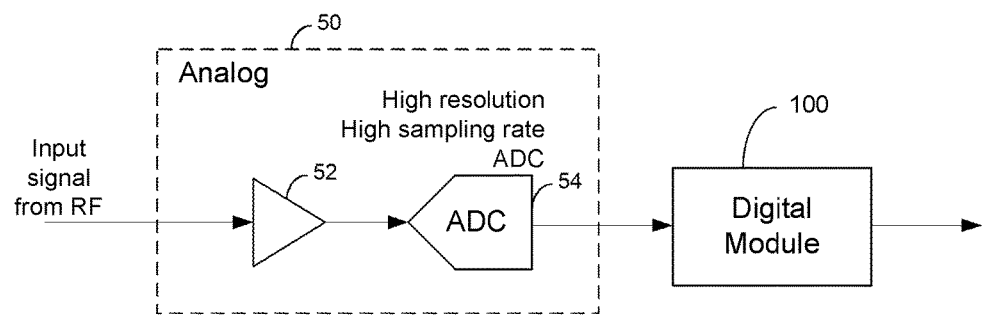
FIG. 2A shows a direct RF sampling architecture, according to the invention.

FIG. 2A shows a direct RF sampling architecture, according to the invention, wherein requirements at a front end analog module 50 are reduced and moved to the digital module 100.

Figure 2B:
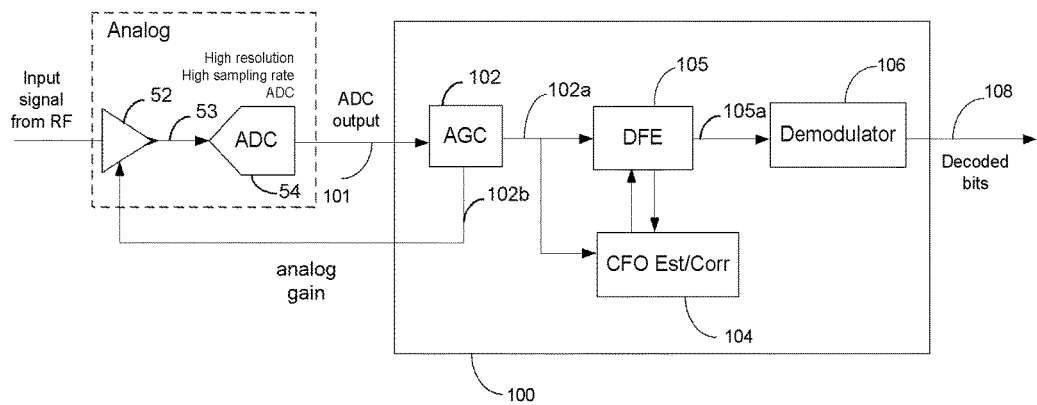
FIG. 2B is a more detailed representation of the direct RF sampling architecture of FIG. 2A.

FIG. 2B is a more detailed representation of the direct RF sampling architecture of FIG. 2A.

At the input of the analog module 50, a RF analog signal is sampled at a rate higher than the carrier frequency. In one embodiment of the invention, sampling rate of 54.24 MHz is adopted, which is four times the carrier frequency of 13.56 MHz. The RF analog signal or NFC signal is input to an amplifier 52. The amplifier output 53 is input to an analog-to-digital converter (ADC) 54. The ADC output 101 is input to the digital module 100, particularly, to an automatic gain control (AGC) 102. AGC 102 sends a feedback signal 102b with an appropriate analog gain value to the amplifier 52 at the analog module 50 to control or calibrate RF analog signal to be within a suitable signal range for ADC input. The AGC output 102a is input to both digital front end (DFE) module 105 and carrier frequency offset (CFO) estimation and CFO correction module 104. The DFE module output 105a is input to the demodulator 106 which is configured to extract decoded bits 108 from the DFE output 105a.

Figure 3A:
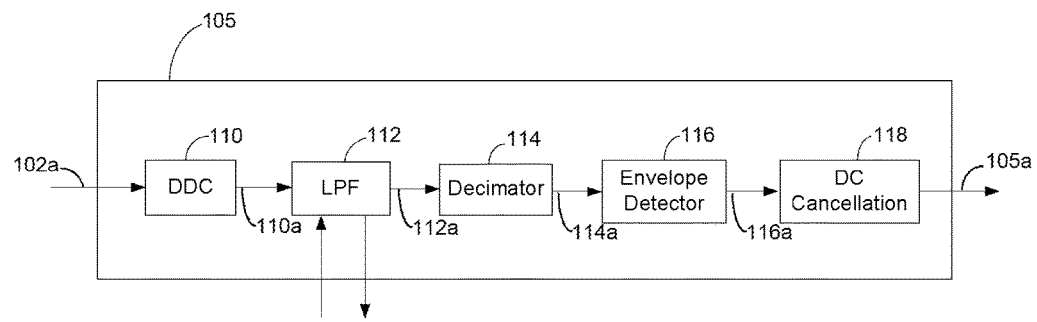
FIG. 3A is a more detailed representation of the DFE module.
Figure 3B:
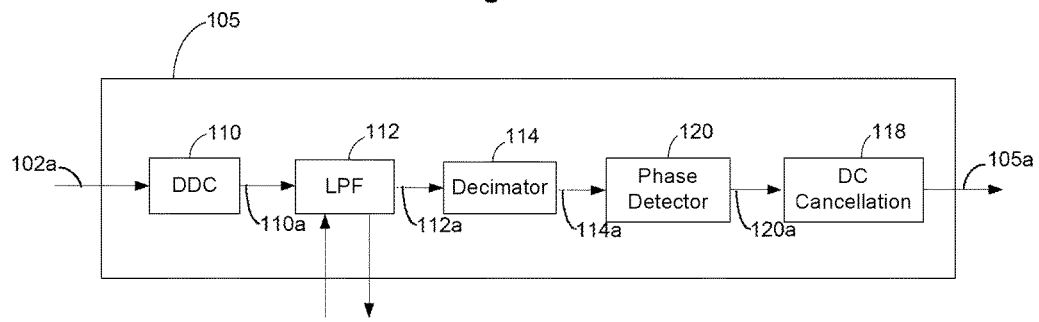
FIG. 3B is a more detailed representation of an alternative DFE module.

FIG. 3A is a more detailed representation of the DFE module 105 which includes a digital downconverter (DDC) 110, a low pass filter (LPF) 112, a decimator 114, an envelope detector 116, an optional DC cancellation module 118. FIG. 3B is a more detailed representation of an alternative DFE module 105 which includes a digital downconverter (DDC) 110, a low pass filter (LPF) 112, a decimator 114, a phase detector 120, an optional DC cancellation module 118. In FIGS. 3A and 3B, the DDC output 110a is input to the LPF 112. The LPF output 112a is input to the decimator 114. The decimator 114 is configured to downsample the LPF output 112a into a lower sampling frequency output. In FIG. 3A, the decimator output 114a is input to envelope detector 116 whose output 116a is input to DC cancellation module 118. In FIG. 3B, the decimator output 114a is input to the phase detector 120 whose output 120a is input to the DC cancellation module 118.

In FIGS. 3A and 3B, DDC 110 is configured to perform downconversion based on zero frequency offset. At DDC 110, the AGC output 102a is multiplied by a locally generated downconversion sample represented by $$\cos\frac{2\pi f_C n}{f_S} \text{ and } \sin\frac{2\pi f_C n}{f_S},$$

where $f_C$ is the carrier frequency, $f_S$ is the ADC sampling frequency, and n is the sample number. For $f_S = 4 f_C$, the downconversion becomes very simple as the $$\cos\frac{2\pi f_C n}{f_S} \text{ and } \sin\frac{2\pi f_C n}{f_S}$$

can be replaced by the sequence of (1,0,−1,0) and (0,1,0,−1), respectively.

Figure 4:
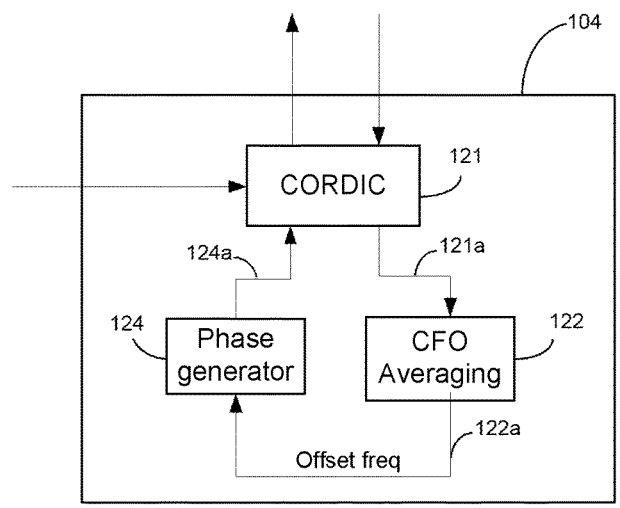
FIG. 4 is a more detailed representation of the CFO estimation and correction module.

FIG. 4 is a more detailed representation of the CFO estimation and correction module 104 which includes a Coordinate Rotation Digital Computer (CORDIC) module 121, a CFO averaging module 122 and a phase generator 124. The CORDIC module 121 is configured to compute, based on the LPF output 112a, a phase difference for CFO estimation. The CFO averaging module 122 is configured to compute an average of the computed phase differences for time t and time t+1. The CFO averaging module 122 outputs a frequency offset value 122a. Based on this frequency offset value 122a, the phase generator 124 computes a phase input 124a, i.e. phase_input[n+1]=phase_input[n]+2π($f_c$+Δf)/$f_s$ where Δf is the carrier frequency offset.

The CORDIC module 121 is further configured to rotate the AGC output 102a based on the phase generator output 124a, i.e. the computed phase input. The rotation is equivalent to multiplying the AGC output 102a with locally generated downconversion sample of $$\cos\frac{2\pi(f_C + \Delta f)n}{f_S} \text{ and } \sin\frac{2\pi(f_C + \Delta f)n}{f_S}.$$

While phase computation and rotation is performed by CORDIC module 121 in the above description, it will be understood by a person of ordinary skill in the art that alternative phase computation and rotation could be used instead.

The above-described modules may be utilised in a downconversion process at a NFC receiver operating as either NFC reader or NFC tag, as illustrated in FIG. 5A.

In block 501, a NFC receiver at a wireless communication device or NFC-supported device detects a RF field and receives a NFC signal.

In block 502, it is ascertained whether the NFC receiver is operating as NFC tag. If the NFC is ascertained as operating as NFC tag, the sequence proceeds to block 503. If not, i.e. the NFC is operating as NFC reader, the sequence proceeds to block 511.

Figure 6A:
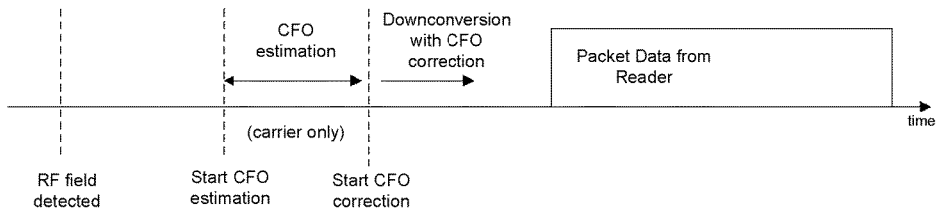
FIG. 6A shows a timeline diagram illustrating downconversion in a NFC tag.
Figure 6B:
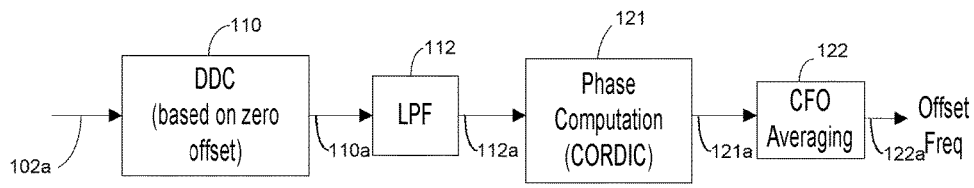
FIG. 6B shows CFO estimation in the downconversion of FIG. 6A.
Figure 6C:
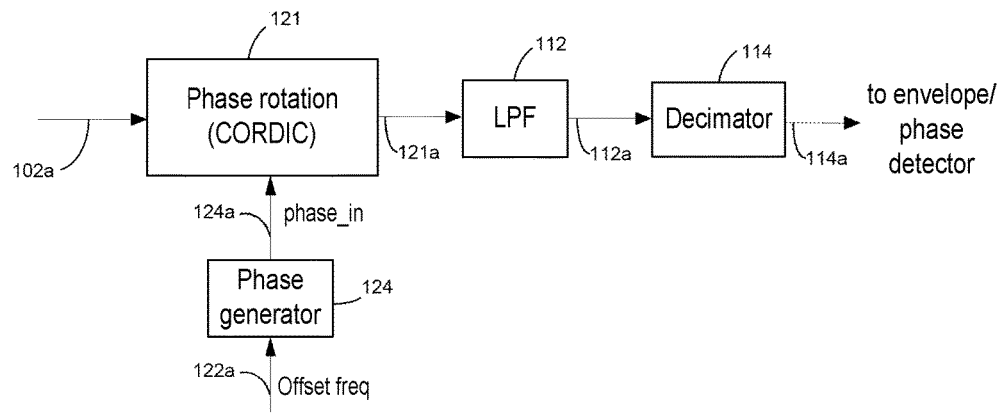
FIG. 6C shows CFO correction in the downconversion of FIG. 6A.

When the NFC receiver operates as a NFC tag, clock frequency between NFC tag and reader devices may not be in a synchronous state. Thus, in block 503, the clock frequency offset is handled in digital domain by performing CFO estimation. During reception of reader data, downconversion with CFO correction in block 504 is then performed based on the estimated frequency offset ascertained in block 503. A timeline diagram illustrating downconversion for NFC tag RX is shown in FIG. 6A. FIG. 6B shows CFO estimation where the AGC output 102a is input to DDC 110 for downconversion based on zero frequency offset; the DDC output 110a is input to LPF 112; the LPF output 112a is input to CORDIC module 121 for phase computation; the CORDIC module output 121a is input to CFO averaging module 122; the CFO averaging module output 122a is a computed frequency offset value. FIG. 6C shows CFO correction where the computed frequency offset value 122a is input to the phase generator 124; the phase generator output 124a is input to the CORDIC module 121 for phase rotation; the CORDIC output 121b is input to LPF 112; the LPF output 112a is input to decimator 114; the decimator output 114a is input to envelope detector 116 or phase detector 120.

Figure 7:
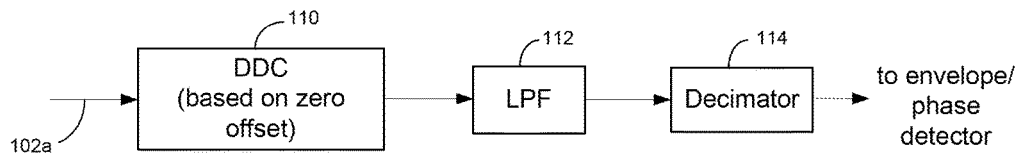
FIG. 7 shows downconversion in a NFC reader.

When the NFC receiver operates as a NFC reader, the received NFC signal is in synchronous state. Thus, CFO estimation is not required and the CFO correction can be set based on zero frequency offset. In block 511, downconversion is performed based on zero frequency offset. FIG. 7 shows downconversion in a NFC reader where the AGC output 102a is input to DDC 110 for downconversion based on zero frequency offset; the DDC output 110a is input to LPF 112; the LPF output 112a is input to decimator 114; the decimator output 114a is input to envelope detector 116 or phase detector 120.

Referring to FIG. 3A, the envelope detector 116 is configured to estimate the magnitude of complex baseband signal, which consists of in-phase (I) and quadrature-phase (Q) signals. The envelope detection can be implemented by using approximation of the square root function e.g. magnitude=sqrt($I^2+Q^2$)≈Alpha*max(|I|, |Q|)+Beta*min(|I|, |Q|), where Alpha and Beta are constants.

Referring to FIG. 3B, the phase detector 120 is configured to estimate the phase of the decimator output 114*a* being a complex baseband signal. The phase detector 120 can be implemented by computing arc tan of (Q/I) or by using CORDIC.

Referring to FIGS. 3A and 3B, DC cancellation module 118 is configured to remove DC offset component from the envelope detector output 116*a* or phase detector output 120*a*. The DC cancellation module 118 may include filtering of higher frequency components with low pass filter, moving average filtering to smooth out the low pass filter output, and offsetting the delayed version of the envelope/phase detector output with moving average filter output.

Figure 8A:
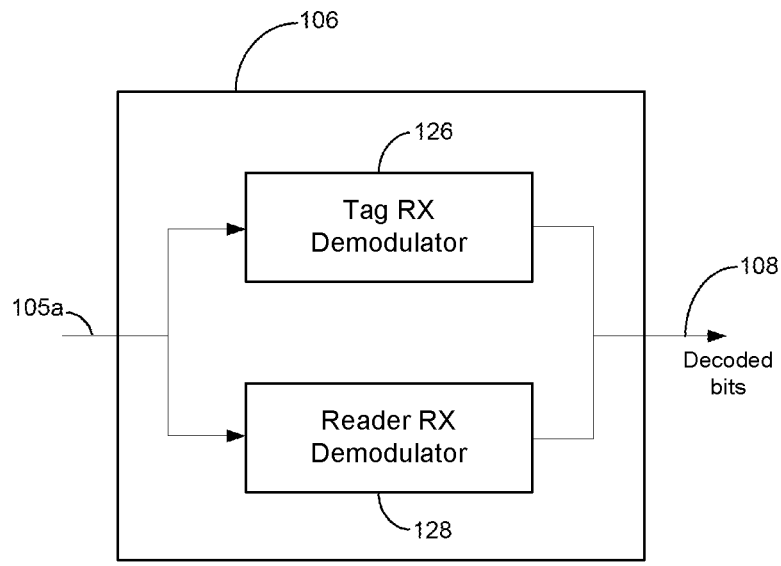
FIG. 8A is a more detailed representation the demodulator.
Figure 8B:
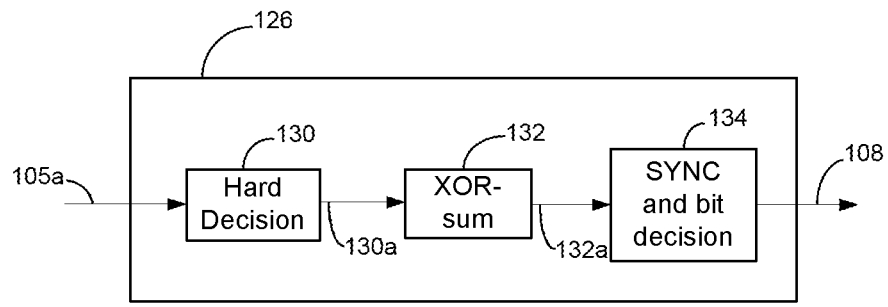
FIG. 8B is a more detailed representation of a tag RX demodulator module in the demodulator of FIG. 8A.
Figure 8C:
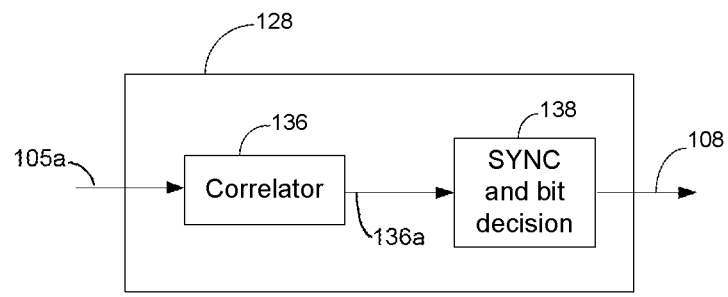
FIG. 8C is a more detailed representation of a reader RX demodulator module in the demodulator of FIG. 8A.

Referring to the demodulator 106 in FIG. 2B, FIGS. 8A to 8C are more detailed representations of the demodulator 106. The demodulator 106 includes a tag RX demodulator 126 and reader RX demodulator 128 (see FIG. 8A). Either one is operative depending on whether the NFC receiver is operating as NFC tag or NFC receiver. As shown in FIG. 8B, the tag RX demodulator 126 includes a hard decision module 130, an XOR-sum module 132, a SYNC and bit decision module 134. As shown in FIG. 8C, the reader RX demodulator 128 includes a correlator 136, a SYNC and bit decision module 138. It is to be appreciated that the RX demodulator in FIG. 8B and FIG. 8C can be used as a Tag or Reader RX demodulator interchangeably.

The demodulator 106 is operative with all NFC specifications, such as ISO14443A, ISO14443B, Felica, ISO15693, etc.

The hard decision module 130 is configured to convert the DC cancellation module output 105*a* to "0" and "1". If DC cancellation output 105*a* is greater than or equal to a predetermined threshold, the hard decision output 130*a* will be "1". Otherwise, hard decision module output 130*a* will be "0". The hard decision module output 130*a* is input to the XOR-sum module 132 and is provided as binary data stream. However, RF effects, such as antenna coupling, may cause pulse width variation of the binary data stream waveform.

Figure 9A:
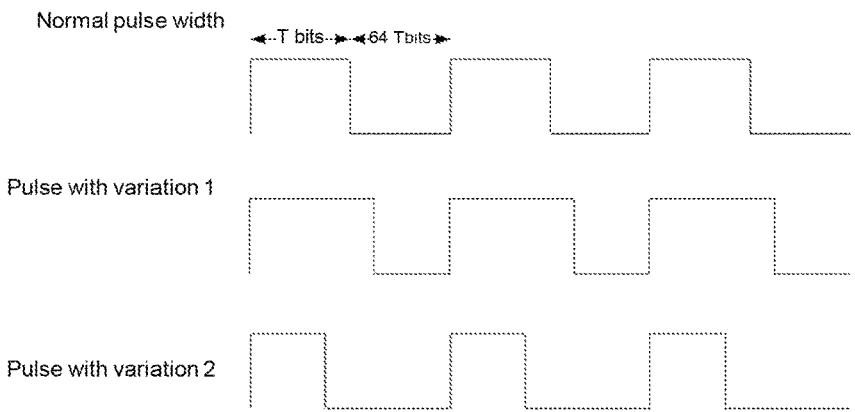
FIG. 9A illustrates an example pulse width waveform using ISO14443A (NFC-A) 106 kbps.

To illustrate the XOR-sum module 132, an example using ISO14443A (NFC-A) 106 kbps is described with reference to FIG. 9A. At a sampling rate of 13.56 Msps, normal pulse width duration is 64 samples for one Manchester coding bit duration. The value of 64 is obtained from 13.56 Msps/106 Kbps/2. According to the standard specification, the transmitted pulse width T (or t1) is allowed within 28/fc to 40.5/fc, which is 28 to 41 samples at sampling rate 13.56 Msps. However, due to RF distortions, the pulse width may increase by 50%, i.e. from 41 to 61 samples as the maximum pulse width. It may also reduce by 50%, i.e. from 28 to 14 samples as the minimum pulse width. The complete pulse width range for NFC-A 106/212/424/848 kbps is shown in Table 1.

TABLE 1

Parameters for NFC-A Tag RX Sequences

| Parameter | Bit Rate | | | |
|---|---|---|---|---|
| | 106 kbps | 212 kbps | 424 kbps | 848 kbps |
| t1 (max) at Reader TX | 40.5/fc | 20/fc | 10/fc | 5.5/fc |
| t1 (min) at Reader TX | 28/fc | 16.5/fc | 8/fc | 4/fc |

TABLE 1-continued

Parameters for NFC-A Tag RX Sequences

| Parameter | Bit Rate | | | |
|---|---|---|---|---|
| | 106 kbps | 212 kbps | 424 kbps | 848 kbps |
| t1 (max) at Tag RX after ADC | 60/fc | 30/fc | 15/fc | 9/fc |
| t1 (min) at Tag RX after ADC | 14/fc | 8/fc | 4/fc | 2/fc |

Figure 9B:
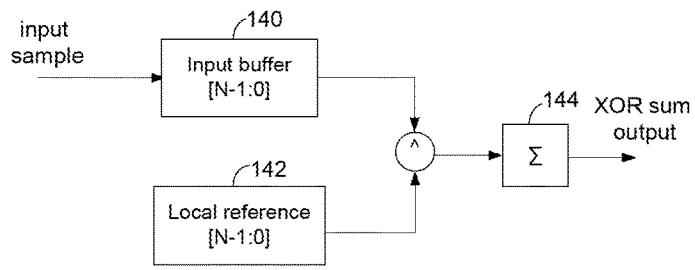
FIG. 9B shows an XOR-sum module with local reference length of N.

In order to adapt to variable pulse width, an XOR-sum module 132 may be employed. FIG. 9B shows an XOR-sum module 132 with local reference length of N. Input buffer 140 collects samples from input sample. Each sample of the input buffer 140 is XOR-ed with corresponding coefficients of the local reference 142. The XOR result is then summed together at summation module 144 to obtain the XOR-sum output. XOR-sum operation is carried out at every input sample before frame synchronisation (SYNC) takes place. After the SYNC takes place, the XOR-sum operation is carried out only once at the synchronization timing for each bit to significantly reduce tag RX computation power consumption.

Figure 9C:
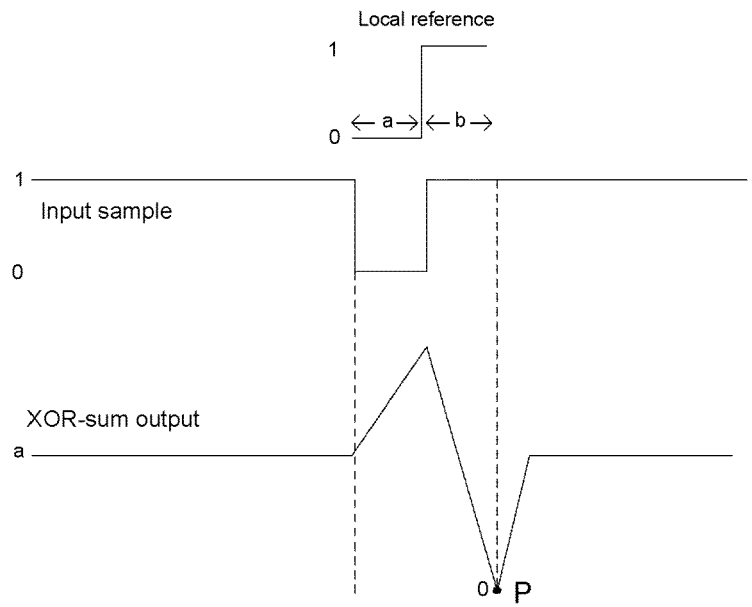
FIG. 9C shows an example of XOR-sum output.

For NFC-A, the length and local reference will be set as shown in Table 2. For example, the local reference has 64 samples for 106 kbps mode and is set to "0 0 0 . . . 0 0 1 1 . . . 1 1", where there are (64−N1) samples of bit "1" after N1 samples of bit "0". N1 value can be adjusted based on the pulse width of modified miller coded "0". N1 is set to 34, which is the mean value of transmitted minimum pulse width 28 and maximum pulse width 40. With same concept, N2, N3 and N4 are set to 18, 9 and 8 in Table 2, respectively. Example of XOR-sum output is shown in FIG. 9C where point P is the minimum peak that matches the local reference.

TABLE 2

NFC-A Tag RX XOR Operation Length and Coefficients

| Specification | Data Rate (kbps) | Reference Length | Local Reference | N |
|---|---|---|---|---|
| 14443A | 106 | 64 | 0 0 0 . . . 0 0 (N1 zeros) 1 1 1 . . . 1 1 (64 - N1 ones) | 34 |
| | 212 | 32 | 0 0 0 . . . 0 0 (N2 zeros) 1 1 1 . . . 1 1 (32 - N2 ones) | 18 |
| | 424 | 16 | 0 0 0 . . . 0 0 (N3 zeros) 1 1 1 . . . 1 1 (16 - N3 ones) | 9 |
| | 848 | 8 | 0 0 0 . . . 0 0 (N4 zeros) 1 1 1 . . . 1 1 (8 - N4 ones) | 8 |

Figure 10:
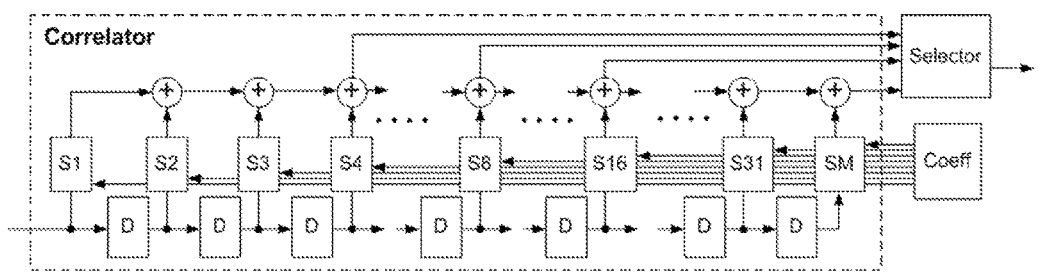
FIG. 10 shows an example of correlator implementation.

In FIG. 8C, the correlator 136 is configured to accumulate the signal power over bit duration for better bit detection and performance. An example of correlator implementation with M maximum correlator length is shown in FIG. 10. The block "D" indicates a register with 1-sample delay. All the blocks "S1", "S2", . . . "SM" indicates sign switching based on input coefficients length. If the coefficient is '1', the output is equal to the input. If the coefficient is '−1', the output is the negative of the input. The outputs of "S1", . . . , "SM" blocks are summed and selected based on the data rate. For example, in FIG. 10 the outputs for "S4", "S8", "S16" and SM" blocks are selected and sent to the SYNC and bit decision module 138.

The correlator length is determined based on the bit duration and input data sampling rate. For example, for NFC-A 106 kbps with input sampling rate of 3.39 Msps, one bit duration includes 32 samples. For 106 kbps, the decoding can be performed at each Manchester bit (half of bit duration) and thus, the correlator length would be 32/2=16. For NFC-A, the correlator length and coefficients can be set according to Table 3.

TABLE 3

NFC-A Correlator Length and Coefficients

| Specification | Data Rate (kbps) | Correlator Length | Coefficients |
|---|---|---|---|
| 14443A | 106 | 16 | −1 −1 −1 −1 −1 −1 −1 −1 −1 −1 −1 −1 −1 −1 −1 −1 |
| | 212 | 16 | 1 1 −1 −1 1 1 −1 −1 1 1 −1 −1 1 1 −1 −1 |
| | 424 | 8 | 1 1 −1 −1 1 1 −1 −1 |
| | 848 | 4 | 1 1 −1 −1 |

In Table 3, the coefficients for 106 kbps has different pattern from the other three data rates. This is because only 106 kbps mode adopts Manchester coding and the other three adopt NRZ-L with BPSK coding.

Referring to the SYNC and bit decision module 134 or 138 in FIGS. 8B and 8C, the SYNC and bit decision module 134 or 138 is configured to perform frame synchronization (SYNC) according to the respective NFC specifications, and further configured to perform bit decision to determine the final decoded bits stream 108.

Reference is now made to FIGS. 5A to 5C which illustrate method(s) for direct RF sampling in a NFC receiver, including direct RF sampling when the NFC receiver is operating as NFC tag (see FIGS. 5A and 5B) and direct RF sampling when the NFC receiver is operating as NFC reader (see FIGS. 5A and 5C).

In block 501, the NFC receiver detects a RF field at a wireless communication device or NFC-supported device, including receiving a NFC signal. The received NFC signal is digitised at an ADC 54 which outputs a digitised signal 101 which may be input to an AGC module 102.

In block 502, the NFC-supported device is being ascertained as to whether it is operating as NFC tag. If the NFC is ascertained as operating as NFC tag, the digital baseband of the NFC receiver does not require analog clock recovery, and the method proceeds to block 503.

In block 503, an estimate of a CFO between the digitised signal 101 and the device clock frequency is ascertained. The CFO estimation is performed at CFO estimation and correction module 104.

In block 504, based on the estimated CFO, the digitised signal 101 is downconverted with CFO correction which is based on the estimated CFO. The downconversion is performed at DDC module 110 which outputs a downconverted signal 110a which is a baseband complex signal centred at zero frequency.

In block 505, low-pass filtering is performed on the downconverted signal 110a at LPF 112 which outputs a low-pass filtered signal 112a. Downsampling to a lower sampling frequency is performed on the low-pass filtered signal 112a at decimator 114 which outputs a downsampled signal 114a.

In block 506, either magnitude or phase of the downsampled signal 114a is estimated, respectively, at the envelope detector 116 to generate an envelope detector output 116a or at phase detector 120 to generate a phase detector output 120a.

In block 507 (optional), DC offset component in a resulting output from block 506, i.e. the envelope detector output 116a or a phase detector output 120a, is cancelled or removed at DC cancellation module 118. The DC cancellation module 118 outputs a DC cancellation output 105a.

In blocks 508 to 510, one of the DC cancellation output 105a, the envelope detector output 116a and the phase detector output 120a, collectively referred to as a pre-demodulation signal 105a/116a/120a, is demodulated.

In block 508, the pre-demodulation signal 105a/116a/120a is converted to binary state at the hard decision module 130 which outputs a hard decision output 130a being a binary data stream.

In block 509, the hard decision output 130a is accumulated at the XOR-sum module 132 which generates an XOR-sum output 132a. XOR-sum operation is used to adapt to any pulse width variation in the hard decision output 130a.

In block 510, a decoded bit stream 108 is generated from the XOR-sum output 132a.

If the NFC is ascertained as operating as NFC reader, method in block 502 proceeds to block 511.

In block 511, the digitised signal 101 is downconverted based on zero frequency offset. The downconversion is performed at DDC module 110 which outputs a downconverted signal 110a which is a baseband complex signal centred at zero frequency.

In block 512, low-pass filtering is performed on the downconverted signal 110a at LPF 112 which outputs a low-pass filtered signal 112a. Downsampling to a lower sampling frequency is performed on the low-pass filtered signal 112a at decimator 114 which outputs a downsampled signal 114a.

In block 513, either magnitude or phase of the downsampled signal 114a is estimated, respectively, at the envelope detector 116 to generate an envelope detector output 116a or at phase detector 120 to generate a phase detector output 120a.

In block 514 (optional), DC offset component in a resulting output from block 513, i.e. the envelope detector output 116a or a phase detector output 120a, is cancelled or removed at DC cancellation module 118. The DC cancellation module 118 outputs a DC cancellation output 105a.

In blocks 515 to 516, one of the DC cancellation output 105a, the envelope detector output 116a and the phase detector output 120a, collectively referred to as a pre-demodulation signal 105a/116a/120a, is demodulated.

In block 515 the pre-demodulation signal 105a/116a/120a is correlated at the correlator 136 to improve bit detection and performance. The correlator 136 generates a correlated output 136a.

In block 516, a decoded bit stream 108 is generated from the correlated output 136a.

Embodiments of the invention provide direct RF sampling receiver architecture and method(s) which are advantageous at least as described in the following:

Direct RF sampling architecture simplifies the RF analog front end requirements by moving mixing 002 and filtering 004 (see FIG. 1A) to digital module. This leads to a smaller overall IC silicon area of RF/analog modules than the existing architecture shown in FIG. 1A and thereby resulting in lower-cost NFC silicon solution. In one embodiment of the invention, direct RF sampling results in a receiver of RF/analog silicon area below 0.1 mm$^2$, which is only half of an existing product, but is capable of achieving comparable sensitivity performance as in the existing architecture shown in FIG. 1A. In addition, direct RF sampling architecture is superior in terms of integration and technology migration as it minimizes the design complexity of RF/analog front-end circuitry.

Figure 1B:
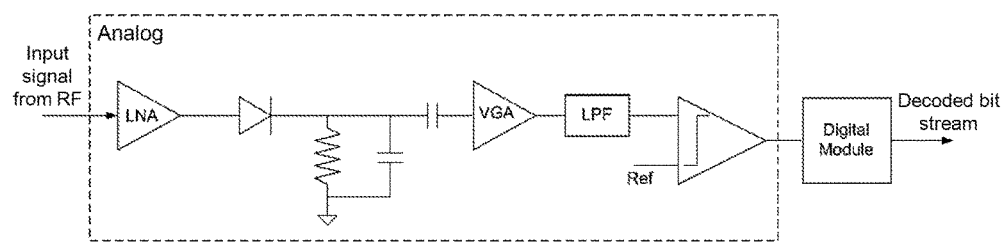
FIG. 1B shows an existing envelope detector based NFC receiver architecture.

With high resolution ADC, the digital module 100 of the invention is capable of achieving better demodulation at lower modulation index than the existing architecture shown in FIG. 1B. Furthermore, digital demodulation will not be limited to only amplitude demodulation. Phase demodulation can be employed to solve NFC communication hole issue.

NFC receiver architecture of the invention can be configured to support both NFC Reader and Tag receiver modes.

In the NFC Tag receiver mode, CFO estimation and correction enable asynchronous reception where analog clock recovery from reader's carrier signal is not required. XOR-sum module also improves robustness against pulse width variation that may occur due to RF distortion.

In the NFC Reader receiver mode, downconversion is based on zero frequency offset and a correlator is utilised to improve bit decision detection and performance.

Other embodiments will be apparent to those skilled in the art from consideration of the specification and practice of the invention. Furthermore, certain terminology has been used for the purposes of descriptive clarity, and not to limit the disclosed embodiments of the invention. The embodiments and features described above should be considered exemplary.

What is claimed is:

1. A Near Field Communication (NFC) receiver comprising:
    an analog-to-digital converter (ADC) for digitising a received NFC signal at a sampling rate higher than a carrier frequency of the received NFC signal;
    a carrier frequency offset (CFO) module which is configured to estimate a CFO between the NFC receiver and a NFC transmitter propagating the received NFC signal if the NFC receiver is operative as tag receiver;
    a digital downconverter which is configured to downconvert, with CFO correction based on the estimated CFO, the digitised signal to a baseband complex signal centered at zero frequency, if the NFC receiver is operative as NFC tag;
    one of an envelope detector and a phase detector for respectively ascertaining one of an amplitude and a phase of the downconverted signal and generating a pre-demodulation signal;
    and
    a demodulator for generating a decoded bit stream from the pre-demodulation signal.

2. The NFC receiver of claim 1, wherein the demodulator includes a first module which is operative if the NFC receiver is operative as NFC tag, wherein the first module includes:
    a hard decision module configured to convert the pre-demodulation signal into binary bit stream based on a predetermined threshold;
    an XOR sum module configured to perform an XOR operation on each locally-stored sample of the binary bit stream with a locally-stored reference followed by a summation operation on a plurality of results generated from the XOR operation; and
    a synchronisation and bit decision module configured to perform frame synchronization and bit decision based the XOR sum module output.

3. The NFC receiver of claim 1, wherein the digital downconverter is further configured to downconvert, with zero frequency offset, the digitised signal to a baseband complex signal centered at zero frequency, if the NFC receiver is operative as NFC reader.

4. The NFC receiver of claim 3, wherein the demodulator includes a second module which is operative if the NFC receiver is operative as NFC receiver,
    a correlator configured to perform multiplication operation on the pre-demodulation signal with a plurality of correlator coefficients; and
    a synchronisation and bit decision module configured to perform frame synchronization and bit decision based the correlator output.

5. The NFC receiver of claim 4, wherein the plurality of correlator coefficients are predetermined based on data rate and the sampling rate.

6. The NFC receiver of claim 1, wherein the digital downconverter is further configured to ascertain whether the NFC receiver is operative as NFC tag or NFC reader.

7. The NFC receiver of claim 1, wherein the sampling rate is four times the carrier frequency of the received NFC signal.

8. The NFC receiver of claim 1, further comprising a DC cancellation module for removing DC offset component from the pre-demodulation signal prior to use in the demodulator.

9. A method of sampling at a Near Field Communication (NFC) receiver, the method comprising:
    detecting a radio frequency (RF) field at a NFC-supported device, including receiving a NFC signal;
    digitising the received NFC signal;
    if the NFC receiver is operating as NFC tag, estimating a carrier frequency offset (CFO) between the digitised signal and a clock frequency of the NFC-supported device, and performing downconversion of the digitised signal with CFO correction based on the estimated CFO; and
    if the NFC receiver is operative as NFC reader, performing downconversion based on zero frequency offset.

10. The method of claim 9, wherein if the NFC receiver is ascertained operating as NFC tag, the method further comprising:
    low-pass filtering the downconverted signal;
    downsampling the low-pass filtered signal;
    estimating one of magnitude and phase of the downsampled signal to generate a pre-demodulation signal; and
    demodulating the pre-demodulation signal, including converting the pre-demodulation signal to a binary data stream, performing XOR-summation operation on the binary data stream to generate an XOR-sum output, and generating a decoded bit stream from the XOR-sum output.

11. The method of claim 10, wherein if the NFC receiver is ascertained operating as NFC reader, the method further comprising:
    low-pass filtering the downconverted signal;
    downsampling the low-pass filtered signal;
    estimating one of magnitude and phase of the downsampled signal to generate a pre-demodulation signal; and demodulating the pre-demodulation signal, including correlating the pre-demodulation signal, and generating a decoded bit stream from the correlated output.

12. The method of claim 10, wherein estimating one of magnitude and phase of the downsampled signal to generate a pre-demodulation signal further includes cancelling DC offset component to generate the pre-demodulation signal.

13. A non-transitory computer readable medium comprising computer program code for direct radio frequency (RF) sampling at a Near Field Communication (NFC) receiver, wherein the computer program code, when executed, is configured to cause a processor in a Near Field Communication (NFC)-supported device perform a method, comprising:
- detecting a radio frequency (RF) field at a NFC-supported device, including receiving a NFC signal;
- digitising the received NFC signal;
- if the NFC receiver is operating as NFC tag, estimating a carrier frequency offset (CFO) between the digitised signal and a clock frequency of the NFC-supported device, and performing downconversion of the digitised signal with CFO correction based on the estimated CFO; and
- if the NFC receiver is operative as NFC reader, performing downconversion based on zero frequency offset.

14. The non-transitory computer readable medium of claim 13, wherein if the NFC receiver is ascertained operating as NFC tag, the method further comprising:
- low-pass filtering the downconverted signal;
- downsampling the low-pass filtered signal;
- estimating one of magnitude and phase of the downsampled signal to generate a pre-demodulation signal; and
- demodulating the pre-demodulation signal, including converting the pre-demodulation signal to a binary data stream, performing XOR-summation operation on the binary data stream to generate an XOR-sum output, and generating a decoded bit stream from the XOR-sum output.

15. The non-transitory computer readable medium of claim 14, wherein if the NFC receiver is ascertained operating as NFC reader, the method further comprising:
- low-pass filtering the downconverted signal;
- downsampling the low-pass filtered signal;
- estimating one of magnitude and phase of the downsampled signal to generate a pre-demodulation signal; and
- demodulating the pre-demodulation signal, including correlating the pre-demodulation signal, and generating a decoded bit stream from the correlated output.

16. The non-transitory computer readable medium of claim 14, wherein estimating one of magnitude and phase of the downsampled signal to generate a pre-demodulation signal further includes cancelling DC offset component to generate the pre-demodulation signal.

* * * * *